(12) United States Patent
Arnold et al.

(10) Patent No.: US 8,815,189 B2
(45) Date of Patent: Aug. 26, 2014

(54) GASOLINE ENGINE EMISSIONS TREATMENT SYSTEMS HAVING PARTICULATE FILTERS

(75) Inventors: Mirko Arnold, Hannover (DE); Stephan Siemund, Pattersen (DE); Attilio Siani, Hannover (DE); Knut Wassermann, Princeton, NJ (US)

(73) Assignee: BASF Corporation, Florham Park, NJ (US)

( * ) Notice: Subject to any disclaimer, the term of this patent is extended or adjusted under 35 U.S.C. 154(b) by 712 days.

(21) Appl. No.: 13/087,497

(22) Filed: Apr. 15, 2011

(65) Prior Publication Data

US 2011/0252773 A1 Oct. 20, 2011

Related U.S. Application Data

(60) Provisional application No. 61/325,478, filed on Apr. 19, 2010, provisional application No. 61/386,997, filed on Sep. 27, 2010.

(51) Int. Cl.
| | |
|---|---|
| *B01D 53/46* | (2006.01) |
| *B01D 53/92* | (2006.01) |
| *B01D 53/94* | (2006.01) |
| *F01N 3/035* | (2006.01) |

(52) U.S. Cl.
USPC ......... 423/213.2; 423/213.7; 60/274; 60/299; 60/301; 95/285; 55/524; 55/DIG. 30

(58) Field of Classification Search
CPC .. B01D 53/92; B01D 53/944; B01D 53/9445; F01N 3/035; F01N 3/0821; F01N 3/101
USPC .............. 423/213.2, 213.7; 60/274, 299, 301; 95/285; 55/524, DIG. 30
See application file for complete search history.

(56) References Cited

U.S. PATENT DOCUMENTS

| | | | |
|---|---|---|---|
| 4,171,288 | A | 10/1979 | Keith et al. |
| 4,329,162 | A | 5/1982 | Pitcher, Jr. |
| 4,902,487 | A | 2/1990 | Cooper et al. |
| 4,961,917 | A | 10/1990 | Byrne |
| 5,221,484 | A | 6/1993 | Goldsmith et al. |
| 5,492,679 | A | 2/1996 | Ament et al. |

(Continued)

FOREIGN PATENT DOCUMENTS

| | | |
|---|---|---|
| EP | 0766993 | 4/1997 |
| JP | 20070283289 A | 11/2007 |

(Continued)

*Primary Examiner* — Timothy Vanoy
(74) *Attorney, Agent, or Firm* — Melanie L. Brown

(57) ABSTRACT

Exhaust systems and components are suitable for use with gasoline engines to capture particulates and to reduce gaseous emissions, where three-way conversion (TWC) catalysts located on a particulate filters are provided. Coated particle filters having washcoat loadings in the range of 1 to 4 g/ft$^3$ result in minimal impact on back pressure while simultaneously providing TWC catalytic activity and particle trapping functionality to meet increasingly stringent regulations such as Euro 6. Sufficient to high levels of oxygen storage components (OSC) are also delivered on and/or within the filter. The filters can have a coated porosity that is substantially the same as its uncoated porosity. The TWC catalytic material can comprise a particle size distribution such that a first set of particles has a first $d_{90}$ particle size of 7.5 µm or less and a second set of particles has a second $d_{90}$ particle size of more than 7.5 µm.

26 Claims, 3 Drawing Sheets

(56) References Cited

U.S. PATENT DOCUMENTS

| | | | |
|---|---|---|---|
| 5,496,788 A | 3/1996 | Domesle et al. |
| 5,516,497 A | 5/1996 | Speronello et al. |
| 5,643,542 A | 7/1997 | Leyrer et al. |
| 5,716,899 A | 2/1998 | Guile et al. |
| 5,935,897 A | 8/1999 | Trubenbach et al. |
| 5,941,918 A | 8/1999 | Blosser |
| 5,958,829 A | 9/1999 | Domesle et al. |
| 6,019,946 A | 2/2000 | Castillo et al. |
| 6,753,294 B1 | 6/2004 | Brisley et al. |
| 6,767,526 B1 | 7/2004 | Blanchard et al. |
| 6,800,107 B2 | 10/2004 | Ishihara et al. |
| 6,912,847 B2 | 7/2005 | Deeba |
| 7,048,894 B2 | 5/2006 | Tanaka et al. |
| 7,078,004 B2 | 7/2006 | Voss et al. |
| 7,093,428 B2 | 8/2006 | LaBarge et al. |
| 7,094,728 B2 | 8/2006 | Yan et al. |
| 7,097,817 B2 | 8/2006 | Brisley et al. |
| 7,107,763 B2 | 9/2006 | Suwabe et al. |
| 7,110,904 B2 | 9/2006 | Lippa et al. |
| 7,225,613 B2 | 6/2007 | Hammerle et al. |
| 7,229,597 B2 | 6/2007 | Patchett et al. |
| 7,297,656 B2 | 11/2007 | Zhang et al. |
| 7,306,771 B2 | 12/2007 | Okawara |
| 7,326,270 B2 | 2/2008 | Hong et al. |
| 7,341,614 B2 | 3/2008 | Hayashi et al. |
| 7,351,382 B2 | 4/2008 | Pfeifer et al. |
| 7,381,682 B1 | 6/2008 | Jia et al. |
| 7,381,683 B1 | 6/2008 | Wang et al. |
| 7,393,377 B2 | 7/2008 | Kasai et al. |
| 7,393,808 B2 | 7/2008 | Yoshida et al. |
| 7,427,308 B2 | 9/2008 | Taoka et al. |
| 7,431,749 B2 | 10/2008 | Kim et al. |
| 7,449,427 B2 | 11/2008 | Ohno et al. |
| 7,462,216 B2 | 12/2008 | Kunieda et al. |
| 7,465,690 B2 | 12/2008 | Yan |
| 7,517,502 B2 | 4/2009 | Ohno et al. |
| 7,517,826 B2 | 4/2009 | Fujdala et al. |
| 7,517,830 B2 | 4/2009 | Nomura et al. |
| 7,534,738 B2 | 5/2009 | Fujdala et al. |
| 7,541,006 B2 | 6/2009 | Yoshida |
| 7,550,117 B2 | 6/2009 | Alward et al. |
| 7,559,967 B2 | 7/2009 | Oya et al. |
| 7,585,471 B2 | 9/2009 | Oshimi |
| 7,601,105 B1 | 10/2009 | Gipson, III et al. |
| 7,605,109 B1 | 10/2009 | Jia et al. |
| 7,610,753 B2 * | 11/2009 | Kitahara ..................... 60/295 |
| 7,611,680 B2 | 11/2009 | Jia et al. |
| 7,666,376 B2 | 2/2010 | Dornseiffer et al. |
| 7,709,414 B2 | 5/2010 | Fujdala et al. |
| 7,745,367 B2 | 6/2010 | Fujdala et al. |
| 7,754,160 B2 | 7/2010 | Miyairi et al. |
| 7,772,151 B2 | 8/2010 | Li et al. |
| 7,799,298 B2 | 9/2010 | Pfeifer et al. |
| 7,832,203 B2 | 11/2010 | Chiffey et al. |
| 8,012,439 B2 * | 9/2011 | Arnold et al. ................. 423/212 |
| 2001/0026838 A1 | 10/2001 | Dettling et al. |
| 2003/0180197 A1 | 9/2003 | Nunan |
| 2004/0065078 A1 | 4/2004 | Schafer-Sindlinger et al. |
| 2004/0219077 A1 | 11/2004 | Voss et al. |
| 2005/0016164 A1 | 1/2005 | Chiffey et al. |
| 2005/0031513 A1 | 2/2005 | McNamara et al. |
| 2005/0109023 A1 | 5/2005 | Kudo et al. |
| 2005/0159308 A1 | 7/2005 | Bliss et al. |
| 2006/0032203 A1 | 2/2006 | Komori et al. |
| 2006/0057046 A1 | 3/2006 | Punke et al. |
| 2006/0093784 A1 | 5/2006 | Komori et al. |
| 2006/0133969 A1 | 6/2006 | Chiffey et al. |
| 2006/0142153 A1 | 6/2006 | Endo et al. |
| 2006/0193757 A1 | 8/2006 | Li et al. |
| 2006/0210765 A1 | 9/2006 | Ohno et al. |
| 2006/0263574 A1 | 11/2006 | Tsunekawa et al. |
| 2006/0292340 A1 | 12/2006 | Ohno et al. |
| 2007/0009400 A1 | 1/2007 | Vakkilainen et al. |
| 2007/0019217 A1 | 1/2007 | Chang |
| 2007/0048494 A1 | 3/2007 | Miyairi et al. |
| 2007/0054803 A1 | 3/2007 | Miyairi |
| 2007/0134138 A1 | 6/2007 | Matsuo et al. |
| 2007/0137187 A1 | 6/2007 | Kumar |
| 2007/0140928 A1 | 6/2007 | Beall et al. |
| 2007/0148402 A1 | 6/2007 | Ohno et al. |
| 2007/0224092 A1 | 9/2007 | Miyairi et al. |
| 2007/0227109 A1 | 10/2007 | Hong et al. |
| 2007/0264486 A1 | 11/2007 | Verdier |
| 2008/0020922 A1 | 1/2008 | Li et al. |
| 2008/0044319 A1 | 2/2008 | Takahashi et al. |
| 2008/0092499 A1 | 4/2008 | Otsuka et al. |
| 2008/0124264 A1 | 5/2008 | Ikeda et al. |
| 2008/0125316 A1 | 5/2008 | Noda et al. |
| 2008/0241015 A1 | 10/2008 | Kudo et al. |
| 2008/0254978 A1 | 10/2008 | Kikuchi et al. |
| 2008/0292513 A1 | 11/2008 | Miyairi |
| 2008/0317646 A1 | 12/2008 | Morisaka et al. |
| 2009/0047188 A1 | 2/2009 | Miyairi et al. |
| 2009/0087365 A1 | 4/2009 | Klingmann et al. |
| 2009/0129995 A1 | 5/2009 | Pfeifer et al. |
| 2009/0137386 A1 | 5/2009 | Pfeifer et al. |
| 2009/0193796 A1 | 8/2009 | Wei et al. |
| 2009/0199539 A1 | 8/2009 | Maunula et al. |
| 2009/0229259 A1 | 9/2009 | Mizutani |
| 2009/0238733 A1 | 9/2009 | Ohno et al. |
| 2009/0246098 A1 | 10/2009 | Endo et al. |
| 2009/0246109 A1 | 10/2009 | Southward |
| 2009/0247396 A1 | 10/2009 | Mizutani |
| 2009/0247399 A1 | 10/2009 | Mizutani et al. |
| 2009/0257935 A1 | 10/2009 | Southward et al. |
| 2009/0285736 A1 | 11/2009 | Schafer-Sindlinger et al. |
| 2009/0288402 A1 | 11/2009 | Voss et al. |
| 2009/0324455 A1 | 12/2009 | Mizutani |
| 2010/0003172 A1 * | 1/2010 | Li et al. ..................... 422/180 |
| 2010/0003453 A1 | 1/2010 | Sato et al. |
| 2010/0003454 A1 | 1/2010 | Sato et al. |
| 2010/0011749 A1 | 1/2010 | Fujiwara et al. |
| 2010/0037600 A1 | 2/2010 | Doring |
| 2010/0077727 A1 | 4/2010 | Southward et al. |
| 2010/0098903 A1 | 4/2010 | Tsuneyoshi et al. |
| 2010/0275579 A1 * | 11/2010 | Klingmann et al. ............ 60/274 |
| 2011/0030346 A1 | 2/2011 | Neubauer et al. |
| 2011/0091361 A1 | 4/2011 | Reinsch et al. |
| 2012/0124976 A1 * | 5/2012 | Roberts et al. .................. 60/299 |

FOREIGN PATENT DOCUMENTS

| | | |
|---|---|---|
| WO | WO-01/12320 | 2/2001 |
| WO | WO-2009/139107 | 11/2009 |
| WO | WO-2009/144573 | 12/2009 |
| WO | WO-2010/009929 | 1/2010 |
| WO | WO-2010/058834 | 5/2010 |
| WO | WO-2010/076509 | 7/2010 |
| WO | WO 2013/160678 A2 * | 10/2013 ............. B01D 53/94 |

* cited by examiner

GASOLINE ENGINE EMISSIONS TREATMENT SYSTEMS HAVING PARTICULATE FILTERS

CROSS-REFERENCE TO RELATED APPLICATIONS

This application claims priority under 35 U.S.C. §119(e) to U.S. Patent Application Ser. Nos. 61/325,478, filed Apr. 19, 2010 and 61/386,997, filed Sep. 27, 2011, each of which is hereby incorporated by reference in its entirety.

TECHNICAL FIELD

This invention pertains generally to emission treatment systems having catalysts used to treat gaseous streams of gasoline engines containing hydrocarbons, carbon monoxide, and oxides of nitrogen in conjunction with particulates. More specifically, this invention is directed to three-way conversion (TWC) catalysts or oxidation catalysts, coated onto and within particulate filters, such as soot filters.

BACKGROUND

Particulate emissions for gasoline engines are being subject to regulations, including the upcoming Euro 6 (2014) standards. In particular, certain gasoline direct injection (GDI) engines have been developed whose operating regimes result in the formation of fine particulates. Existing aftertreatment systems for gasoline engines are not suitable for achieving the proposed particulate matter standard. In contrast to particulates generated by diesel lean burning engines, the particulates generated by gasoline engines, such as GDI engines, tend to be finer and in lesser quantities. This is due to the different combustion conditions of a diesel engine as compared to a gasoline engine. For example, gasoline engines run at a higher temperature than diesel engines. Also, hydrocarbon components are different in the emissions of gasoline engines as compared to diesel engines.

Emission standards for unburned hydrocarbons, carbon monoxide and nitrogen oxide contaminants continue to become more stringent. In order to meet such standards, catalytic converters containing a three-way conversion (TWC) catalyst are located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

A catalyzed particulate trap comprising a TWC catalyst coated onto or within a particulate trap is provided in U.S. Patent Application Pub. No. 2009/0193796 (Wei). The TWC catalyst can be coated on an inlet side, an outlet side, or both of the filter.

Backpressure and volume constraints exhaust systems can limit the ability to add additional treatment components. In some GDI emissions systems, two or more TWC catalyst composites in combination with NOx traps and SCR catalysts are needed to achieve emissions standards. It is a challenge for such systems to accommodate any additional bricks or canisters along the exhaust pipe.

As particulate standards become more stringent, however, there is a need to provide particulate trapping functionality without unduly crowding the exhaust pipe and increasing backpressure. Moreover, HC, NOx, and CO conversions continue to be of interest. Certain filter technology has relatively small pores and/or smaller porosity intended to capture fine particulate matter, but such filters generally cannot accommodate sufficient catalyst loading to meet HC, NOx, and CO conversion requirements.

There is a continuing need to provide a catalyzed filter that provides sufficient TWC in conjunction with an efficient filter without unduly increasing backpressure so that regulated HC, NOx, and CO conversions can be achieved while meeting particulate matter emissions.

SUMMARY

Provided are exhaust systems and components suitable for use in conjunction with gasoline engines to capture particulates in addition to treating gaseous emissions such as hydrocarbons, nitrogen oxides, and carbon monoxides. Of interest is providing a particulate filter for gasoline engines (GPFs or PFGs) that provides full three-way conversion (TWC) functionality with minimal impact on backpressure. It is recognized that a TWC catalyzed filter may need to be used in conjunction with a second TWC catalyst in order to meet regulations and car manufacturer requirements. Particulate matter from gasoline engines are primarily generated during cold start. This is in contrast to the way particulate matter is generated from diesel engines, which is throughout operation of the engine at a roughly constant rate.

Aspects include exhaust treatment systems comprising a three-way conversion (TWC) catalyst coated onto and/or within a particulate filter in an emission treatment system downstream of a gasoline direct injection engine for treatment of an exhaust stream comprising hydrocarbons, carbon monoxide, nitrogen oxides, and particulates.

A first aspect provides a catalyzed particulate filter whose coated porosity is substantially the same as its uncoated porosity. That is, such a coated filter results in a backpressure or pressure drop that is non-detrimental to the performance of the engine. A non-detrimental pressure drop means that the engine will perform generally the same (e.g., fuel consumption) in a wide range of engine operational modes in the presence of a filter substrate that is either in a coated or an uncoated state. One or more detailed embodiments provide that the uncoated porosity and the coated porosity are within 7% (or 6%, or 5%, or 4%, or 3%, or 2.5%, or 2%, or even 1%) of each other. Porosity of the filter, coated or uncoated, is measured on the filter. One way to measure porosity is to section the filter, measure the porosity of each section, and average the results. For example, a filter can be sectioned into a front/inlet piece and a rear/outlet piece, the porosity of each piece can be taken, and the results can be averaged.

Another aspect provides a catalyzed particulate filter comprising a three-way conversion (TWC) catalytic material that is present on or in the filter in an amount of at least 1.0 g/in$^3$ (61 g/L). A detailed embodiment provides that the amount is 1.0 to 4.0 g/in$^3$ (61 g/L to 244 g/L), or 1.5 to 4.0 g/in$^3$, or even 2.0 to 4.0 g/in$^3$. Another detailed aspect provides a catalyzed particulate filter located in an emission treatment system downstream of a gasoline direct injection engine for treatment of an exhaust stream comprising hydrocarbons, carbon monoxide, nitrogen oxides, and particulates, the catalyzed particulate filter comprising: a three-way conversion (TWC) catalytic material that is coated onto or within a particulate filter in an amount in the range of 1.0 to 4.0 g/in$^3$ (61 to 244 g/L); wherein the TWC catalytic material stores at least 100 mg/L of oxygen after a full useful life aging and comprises an oxygen storage component in an amount in the range of 1.0 to 4.0 g/in$^3$ (61 g/L to 244 g/L); wherein the particulate filter comprises a pore size distribution such that a first set of pores has a first mean pore size of 30 μm or less and second set of pores has a second mean pore size of more than 30 µm; and wherein the TWC catalytic material comprises a particle size distribution such that a first set of particles has a first mean particle size of 7.5 µm or less and a second set of particles has a second mean particle size of more than 7.5 µm.

In one or more embodiments, the uncoated porosity and the coated porosity are in the range of 55 to 70%. In another embodiment, the particulate filter comprises a mean pore size in the range of 15-25 µm. In yet another embodiment, the coated and uncoated porosities are in the range of 60 to 70% and the particulate filter has a mean pore size in the range of 18-23 µm. Certain embodiments can provide that the catalyzed particulate filter, that is the coated filter, can also comprise a mean pore size in the range of 13-23 µm (or even 16-21 µm).

The particulate filter can comprise a pore size distribution such that a first set of pores has a first mean pore size of 30 µm or less and second set of pores has a second mean pore size of more than 30 µm. The first mean pore size can be in the range of 5-30 µm and the second mean pore size can be in the range of 30-300 µm. The first mean pore size can be in the range of 10 to 30 µm and the second mean pore size can be in the range of 30 to 100 µm.

The TWC catalytic material can comprise a particle size distribution such that a first set of particles has a first $d_{90}$ particle size of 7.5 µm or less and a second set of particles has a second $d_{90}$ particle size of more than 7.5 µm. The first mean particle size can be in the range of 1-7.5 µm (or 1-6.5 µm, or 1-6.0 µm, or 1-5.5 µm, or even 1-5.0 µm) and the second mean particle size can be in the range of 7.6-100 µm (or 10-100 µm, or 15-100 µm, or 20-100 µm, or 30-100 µm, or even 50-100 µm). A $d_{90}$ particle size refers to the point on the particle size distribution curve that provides the point of 90% of the particles having a size of equal to or less than the $d_{90}$. In other words, only 10% of the particles will have a particle size that is larger than the $d_{90}$. The TWC catalytic material can comprise the second set of particles in an amount of 10% or more by weight, such as 10-50% (or 10-40% or 10-30% or even 10-20%) by weight. A detailed embodiment provides that the first $d_{90}$ particle size is 6.0 µm or less and the second $d_{90}$ particle size is 10.0 µm or more.

One embodiment provides that the TWC catalytic material stores at least 100 mg/L (or even 200 mg/L) of oxygen after a full useful life aging. A detailed embodiment provides that the oxygen storage component is present in an amount in the range of 1.0 to 4.0 g/in³ (61 g/L to 244 g/L).

The TWC catalytic material can comprise a washcoat comprising a platinum group metal and an oxygen storage component. One or more embodiments provide that the washcoat is provided in a single layer. The washcoat can be provided on the inlet side, the outlet side, or both of the particle filter. The washcoat can comprise rhodium, palladium, ceria or a ceria composite, and alumina. As desired, the washcoat can be free of alumina (that is, no alumina is deliberately added to the washcoat, but may be present in trace amounts), simply comprising, for example, rhodium, palladium, and ceria or a ceria composite.

In one embodiment, a first single washcoat layer is present on the inlet side along 100% of the axial length of the particulate filter and a second single washcoat layer is present on the outlet side along 100% of the axial length of the particulate filter. In another embodiment, a first single washcoat layer is present on the inlet side along 50 to 75% of the axial length of the particulate filter from the upstream end and a second single washcoat layer is present on the outlet side along 50 to 75% of the axial length of the particulate filter from the downstream end. Yet another embodiment provides that a first single washcoat layer is present on the inlet side along up to 50% of the axial length of the particulate filter from the upstream end and a second single washcoat layer is present on the outlet side along up to 50% of the axial length of the particulate filter from the downstream end.

The particulate filter can comprise cordierite, alumina, silicon carbide, aluminum titanate, or mullite.

Further embodiments include catalyzed filters having an upstream zone and a downstream zone both comprising a platinum group metal, such as a palladium component, wherein the upstream zone comprises the platinum group metal in an amount that is greater than the amount of the platinum group metal in the downstream zone.

Methods of treating an exhaust gas comprising hydrocarbons, carbon monoxide, nitrogen oxides, and particulates are also provided. The methods comprise: providing a catalyzed particulate filter comprising a three-way conversion (TWC) catalytic material coated onto or within a particulate filter in an amount of effective to provide a particulate emissions number of no more than $6 \times 10^{11}$ per kilometer; locating the catalyzed particulate filter downstream of a gasoline direct injection engine; and contacting exhaust gas from the gasoline direct injection engine with the catalyzed particulate filter.

The methods can further comprise providing full TWC functionality by the catalyzed particulate filter, a TWC catalyst on a flow through substrate, or combinations thereof.

Detailed embodiments provide that the particulate emissions number is no more than $4.0 \times 10^{11}$ per kilometer, no more than $3.0 \times 10^{11}$ per kilometer, or even no more than $2.0 \times 10^{11}$ per kilometer.

Methods of making catalyzed particulate filters are also provided. The methods comprise: providing a particulate filter; providing a three-way conversion (TWC) catalytic material; and coating the TWC catalytic material onto or into the particulate filter in an amount of at least 1.0 g/in³ (61 g/L) to form the catalyzed particulate filter such that the catalyzed particulate filter has a coated porosity that is substantially the same as an uncoated porosity of the particulate filter.

Another aspect provides a method of treating an exhaust gas comprising hydrocarbons, carbon monoxide, nitrogen oxides, and particulates, the method comprising: locating the emissions treatment system of any of the previous embodiments downstream of a gasoline direct injection engine and contacting exhaust gas from the engine with the catalyzed particulate filter.

BRIEF DESCRIPTIONS OF DRAWINGS

DETAILED DESCRIPTION

Figure 1:
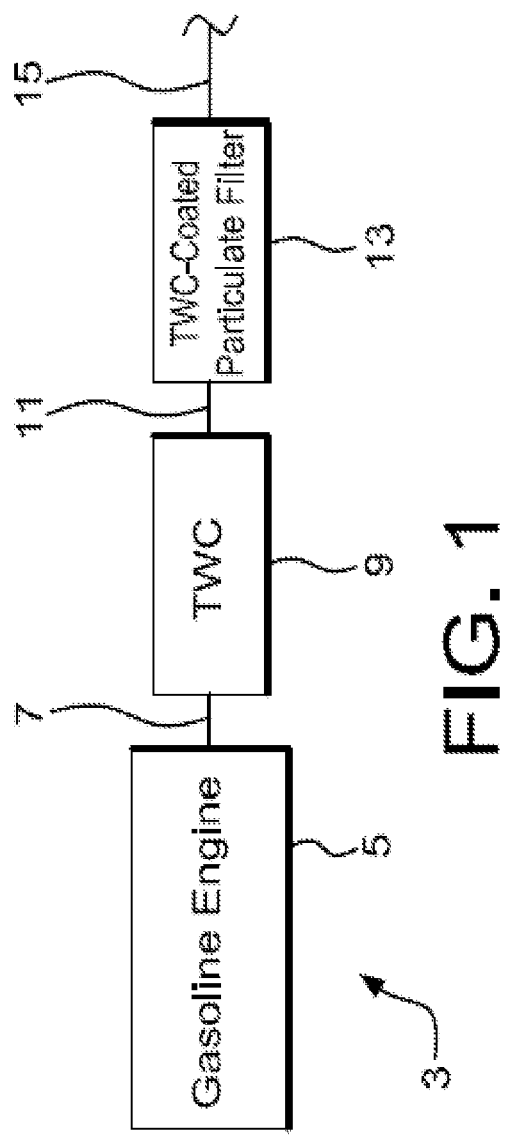
FIG. 1 is a schematic view showing an engine emission treatment system according to a detailed embodiment.

Provided are exhaust systems and components suitable for use in conjunction with gasoline engines, such as gasoline direct injection (GDI) engines, to capture particulates in addition to reducing gaseous emission such as hydrocarbons, nitrogen oxides, and carbon monoxides. In general terms, such gasoline engines operate as stoichiometric ($\lambda=1$), although certain GDI engines may use a lean ($\lambda>1$) regime. Backpressure and volume constraints in gasoline exhaust systems, however, can limit the ability to add additional treatment components. It is a challenge for such systems to accommodate any additional bricks or canisters along the exhaust pipe. As particulate standards become more stringent, however, there is a need to provide particulate trapping functionality without unduly increasing backpressure. We have found that catalyzed particulate filters for gasoline engines (GPFs or PFGs) can be designed with full TWC functionality while achieving suitable filtration efficiency of fine gasoline engine particulate matter. In a first aspect, particulate filters that have a pore size distribution having two or more average pore sizes, that is an asymmetric pore size distribution) can be coated as desired with washcoats having specified particle sizes. In this way, the varying-sized pores of the filter, in conjunction with the surfaces of the filter wall, can be catalyzed for TWC functionality with minimal impact on backpressure while filter efficiency is improved by the presence of washcoat in the larger pores. In a second aspect, levels of washcoat (e.g., 1 to 4 g/in$^3$) are loaded onto particulate filters with minimal impact on back pressure while simultaneously providing TWC catalytic activity and particle trapping functionality to meet increasingly stringent regulations such as Euro 6. Sufficient to high levels of oxygen storage components (OSC) are also delivered on and/or within the filter. The filters can have a coated porosity that is substantially the same as its uncoated porosity. That is, a coated filter has a backpressure similar to an uncoated filter such that there is minimal impact on the overall engine train power performance. In a third aspect, improved light-off of the particulate filter can be achieved through zoning designs. As needed, mechanical modifications and heat management can be utilized to achieve sufficient temperatures in the coated filters. These aspects can be done alone or in conjunction with each other.

With regard to particulate (or particle) filters, typically it is thought that relatively small pores and/or low porosity are desirable to capture fine particulate matter. It has unexpectedly been discovered in detailed embodiments that filters of larger pore size and higher porosity can show improved filtration in the presence of a washcoat loading. Not only is improved filtration achieved, but washcoat loadings on larger pore size/higher porosity filters can further meet gaseous (HC, NOx, and CO) emission standards. Improved filtration over time at constant particle size distribution and washcoat loading is also unexpectedly achieved by the large pore size/high porosity filter as compared to the small pore size/low porosity filter. Without intending to be bound by theory, it is thought that small pore size/low porosity filters generally cannot accommodate sufficient catalyst loading to meet HC, NOx, and CO conversion requirements due to the impact of backpressure.

In one or more embodiments, the filter substrate has two (or more) mean pore sizes, meaning that there can be more than one mean pore size when a pore size distribution measurement is made. Such measurements can be made on filter substrates. For example, there can be two distinct peaks present in the pore size distribution measurement. In one embodiment, the filter has a pore size distribution such that a first mean pore size is less than or equal to 30, 25, 20, 15, or even 10 µm and a second mean pore size is greater than or equal to 30, 50, 70, or even 100 µm), due to an asymmetrical slope of the pore size distribution.

Similarly, catalytic materials can be characterized as having two (or more) average particle sizes, which means that there can be more than one mean particle size present in the catalytic material. One way to demonstrate this is by an asymmetric particle size distribution curve. Such a curve can result from the sum of one or more monomodal (i.e., symmetrical) distributions. For example, there can be two distinct peaks present in a particle size distribution measurement of the catalytic material. In accordance with certain embodiments of the present invention, the catalyst or catalytic material is provided with a particle size distribution such that a first $d_{90}$ particle size is less than or equal to 7.5 µm (e.g., approximately 6.5, 6.0, 5.5, 5, 4, 3, 2, or even 1 µm) and a second $d_{90}$ particle size is greater than 7.5 µm (e.g., 7.6, 10, 15, 20, 30, or even 50 µm). Delivery of a catalytic materials having more than one average particle size can be done in many ways such as by providing one or more washcoats having a particle size distribution of two or more mean particle sizes, or by providing one or more washcoats each having a different monomodal or single particle size distribution, or by combinations thereof. In one embodiment, one washcoat having a particle size distribution such that there are two mean ($d_{50}$) and/or $d_{90}$ particles sizes is provided. In another embodiment, two washcoats are provided, each having a different monomodal particle size distribution. A further embodiment provides that a first washcoat has a particle size distribution of two mean ($d_{50}$) and/or $d_{90}$ particle sizes and a second washcoat has a monomodal particle size distribution. Without intending to be bound by theory, it is thought that the use of catalytic material having a particle size distribution with more than one average particle size will enhance the coating on and within a filter that has a pore size distribution with more than one average pore size. An overall porosity/pore size distribution suitable for trapping fine GDI engine particulates while still providing catalytic treatment of emissions can then be provided without sacrificing backpressure.

Reference to "full TWC functionality" means that HC and CO oxidation and NOx reduction can be achieved in accordance with requirements of regulatory agencies and/or car manufacturers. In this way, platinum group metal components such as platinum, palladium, and rhodium are provided to achieve HC, CO, and NOx conversions and sufficient oxygen storage components (OSC) are provided to achieve sufficient oxygen storage capacity to ensure proper HC, NOx, and CO conversion in an environment of varying A/F (air-to-fuel) ratios. Sufficient oxygen storage capacity generally means that after a full useful life aging as defined by a car manufacturer, the catalyst can store and release a minimum amount of oxygen. In one example, a useful oxygen storage capacity can be 100 mg per liter of oxygen. For another example, a sufficient oxygen storage capacity can be 200 mg per liter of oxygen after 80 hours of exothermic aging at 1050° C. Sufficient oxygen storage capacity is needed to ensure that on-board diagnostics (OBD) systems detect a functioning catalyst. In the absence of sufficient oxygen storage capacity, the OBD will trigger an alarm of a non-functioning catalyst. High oxygen storage capacity is more than the sufficient amount, which widens the operating window of the catalyst and permits more flexibility in engine management to a car manufacturer.

Reference to oxygen storage component (OSC) refers to an entity that has multi-valence state and can actively react with oxidants such as oxygen or nitrous oxides under oxidative conditions, or reacts with reductants such as carbon monoxide (CO) or hydrogen under reduction conditions. Examples of suitable oxygen storage components include ceria. Praseodymia can also be included as an OSC. Delivery of an OSC to the washcoat layer can be achieved by the use of, for example, mixed oxides. For example, ceria can be delivered by a mixed oxide of cerium and zirconium, and/or a mixed oxide of cerium, zirconium, and neodymium. For example, praseodymia can be delivered by a mixed oxide of praseodymium and zirconium, and/or a mixed oxide of praseodymium, cerium, lanthanum, yttrium, zirconium, and neodymium.

Before describing several exemplary embodiments of the invention, it is to be understood that the invention is not limited to the details of construction or process steps set forth in the following description. The invention is capable of other embodiments and of being practiced or being carried out in various ways.

Turning to FIG. 1, an emissions treatment system 3 comprises a gasoline engine 5 that conveys exhaust through line 7 to an optional first TWC catalyst 9. In some instances the first TWC catalyst can be smaller than otherwise needed because of a downstream TWC-coated particulate filter 13, which receives the exhaust stream through line 11. In instances where the TWC-coated particulate filter 13 provides full TWC functionality, the first TWC may not be needed. Line 15 can lead to further treatment components and/or to the tail pipe and out of the system. In other instances, TWC-coated particulate filter 13 contains a TWC catalyst loading that is designed to work in conjunction with the first TWC catalyst in order to meet emission requirements.

Figure 2:
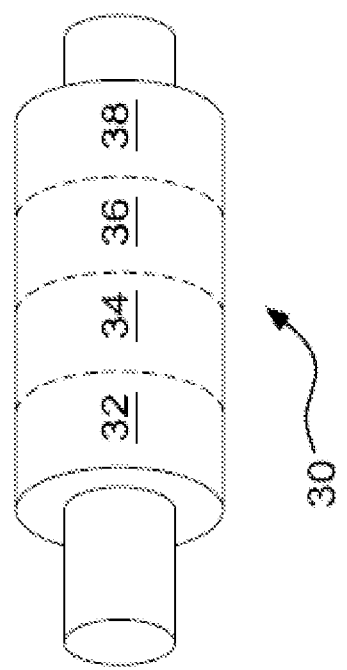
FIG. 2 is a schematic view showing an integrated engine emission treatment system according to an embodiment.

FIG. 2 depicts an integrated emission treatment system 30 comprises a TWC catalyst section 32, a particulate filter section 34, an optional $NO_x$ trap 36 and SCR 38. During the treatment of an exhaust gas emission stream the exhaust gas flows from an engine through the integrated emission treatment system 30 for the treatment and/or conversion of exhaust gas emission contaminants such as unburned hydrocarbons (HC), carbon monoxide (CO), nitrogen oxides ($NO_x$), and particulate matter. The exhaust gas flows sequentially through the upstream TWC catalyst section 32, a particulate filter section 34, an optional $NO_x$ trap 36 and SCR catalyst 38. In an alternative integrated system, the TWC catalyst can be coated onto the particulate filter, thereby eliminating a section.

TWC catalysts that exhibit good activity and long life comprise one or more platinum group metals (e.g., platinum, palladium, rhodium, rhenium and iridium) disposed on a high surface area, refractory metal oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material. The refractory metal oxide supports may be stabilized against thermal degradation by materials such as zirconia, titania, alkaline earth metal oxides such as baria, calcia or strontia or, most usually, rare earth metal oxides, for example, ceria, lanthana and mixtures of two or more rare earth metal oxides. For example, see U.S. Pat. No. 4,171,288 (Keith). TWC catalysts can also be formulated to include an oxygen storage component.

Reference to a "support" in a catalyst washcoat layer refers to a material that receives precious metals, stabilizers, promoters, binders, and the like through association, dispersion, impregnation, or other suitable methods. Examples of supports include, but are not limited to, high surface area refractory metal oxides and composites containing oxygen storage components. High surface refractory metal oxide supports refer to support particles having pores larger than 20 Å and a wide pore distribution. High surface area refractory metal oxide supports, e.g., alumina support materials, also referred to as "gamma alumina" or "activated alumina," typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst. "BET surface area" has its usual meaning of referring to the Brunauer, Emmett, Teller method for determining surface area by $N_2$ adsorption.

One or more embodiments include a high surface area refractory metal oxide support comprising an activated compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria. Examples of composites containing oxygen storage components include, but are not limited to, ceria-zirconia and ceria-zirconia-lanthana. Reference to a "ceria-zirconia composite" means a composite comprising ceria and zirconia, without specifying the amount of either component. Suitable ceria-zirconia composites include, but are not limited to, composites having, for example, 5%, 10%, 15%, 20%, 25%, 30%, 35%, 40%, 45%, 50%, 55%, 60%, 65%, 70%, 75%, 80%, 85%, 90% or even 95% of ceria content. Certain embodiments provide that the support comprises bulk ceria having a nominal ceria content of 100% (i.e., >99% purity). In one or more embodiments, the support material is substantially free of alumina to maximize the oxygen storage capacity of the catalyst. Reference to "substantially free of alumina" means that alumina is present in an amount of no more than 5% of the total loading of the catalytic material. As desired, the catalytic material can be entirely free of alumina, that is, it can be alumina-free.

As used herein, molecular sieves, such as zeolites, refer to materials, which may in particulate form support catalytic precious group metals, the materials having a substantially uniform pore distribution, with the mean pore size being no larger than 20 Å. Reference to a "non-zeolite-support" in a catalyst washcoat layer refers to a material that is not a molecular sieve or zeolite and that receives precious metals, stabilizers, promoters, binders, and the like through association, dispersion, impregnation, or other suitable methods. Examples of such supports include, but are not limited to, high surface area refractory metal oxides.

Reference to "impregnated" means that a precious metal-containing solution is put into pores of a support. In detailed embodiments, impregnation of precious metals is achieved by incipient wetness, where a volume of diluted precious metal-containing is approximately equal to the pore volume of the support bodies. Incipient wetness impregnation generally leads to a substantially uniform distribution of the solution of the precursor throughout the pore system of the support. Reference to "intimate contact" includes having an effective amount of components in such contact (for example, Pd and OSC) on the same support, in direct contact, and/or in substantial proximity such that the OSC contacts oxygen components before the Pd component.

The TWC catalytic material can comprise a first washcoat comprising a platinum group metal and an oxygen storage component composite material. Optionally, the filter can be coated before any platinum group metal-containing washcoat with an under washcoat comprising ceria and optionally a stabilizer selected from the group consisting of lanthanum, zirconium, praseodymium, yttrium, and neodymium. The oxygen storage component can be preset in an amount in the range of 0.5 to 4.0 g/in$^3$ (30.5 g/L to 244 g/L). One embodiment provides the TWC catalytic material being substantially free of alumina. Another embodiment provides that the TWC catalytic material is free of NOx trapping components. In yet another embodiment, the TWC catalytic material stores at least 200 mg/L of oxygen after a full useful life aging.

In a zoned embodiment, the catalyzed particulate filter comprises an upstream zone and a downstream zone that both comprise a palladium component, wherein the upstream zone comprises the palladium component in an amount that is greater than the amount of the palladium component in the downstream zone. One example provides that there is 20-100 g/ft$^3$ (0.7 to 3.5 g/L) of palladium in the upstream zone and 1-20 g/ft$^3$ for downstream.

Particulate Trap

Reference to particulate trap means a filter so sized and configured to trap particulates generated by the combustion reactions in the direct injection gasoline engine. Trapping of particulates can occur, for example, by use of a particulate (or soot) filter, by use of a flow-through substrate having an internal tortuous path such that a change in direction of flow of the particulates causes them to drop out of the exhaust stream, by use of a metallic substrate, such as a corrugated metal carrier, or by other methods known to those skilled in the art. Other filtration devices may be suitable, such as a pipe with a roughened surface that can knock particles out of the exhaust stream. A pipe with a bend may also be suitable.

Figure 3:
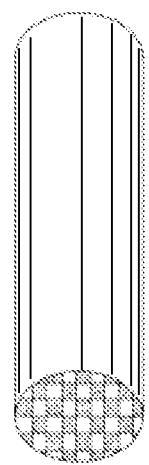
FIG. 3 is a perspective view of a wall flow filter substrate.

With reference to filters, FIG. 3 depicts a perspective view of an exemplary wall flow filter substrate suitable for a particulate filter. Wall flow substrates useful for supporting the TWC or oxidation catalyst compositions have a plurality of fine, substantially parallel gas flow passages extending along the longitudinal axis (or axial length) of the substrate. Typically, each passage is blocked at one end of the substrate body, with alternate passages blocked at opposite end-faces. Such monolithic carriers may contain up to about 300 flow passages (or "cells") per square inch of cross section, although far fewer may be used. For example, the carrier may have from about 7 to 300, more usually from about 200 to 300, cells per square inch ("cpsi"). The cells can have cross sections that are rectangular, square, circular, oval, triangular, hexagonal, or are of other polygonal shapes. Wall flow substrates typically have a wall thickness between 0.008 and 0.016 inches. Specific wall flow substrates have a wall thickness of between 0.010 and 0.012 inches. Axial zoning may be desirable such that a coating is provided along an axial length of the filter. On the inlet side, as measured from the upstream end 54, a coating may extend up to 50% of the axial length (e.g., 1 to 49.9%, or 10 to 45%), 50 to 75% of the axial length, or even 100% of the axial length. On the outlet side, as measured from the downstream end 56, a coating may extend up to 50% of the axial length (e.g., 1 to 49.9%, or 10 to 45%), 50 to 75% of the axial length, or even 100% of the axial length.

Figure 4:
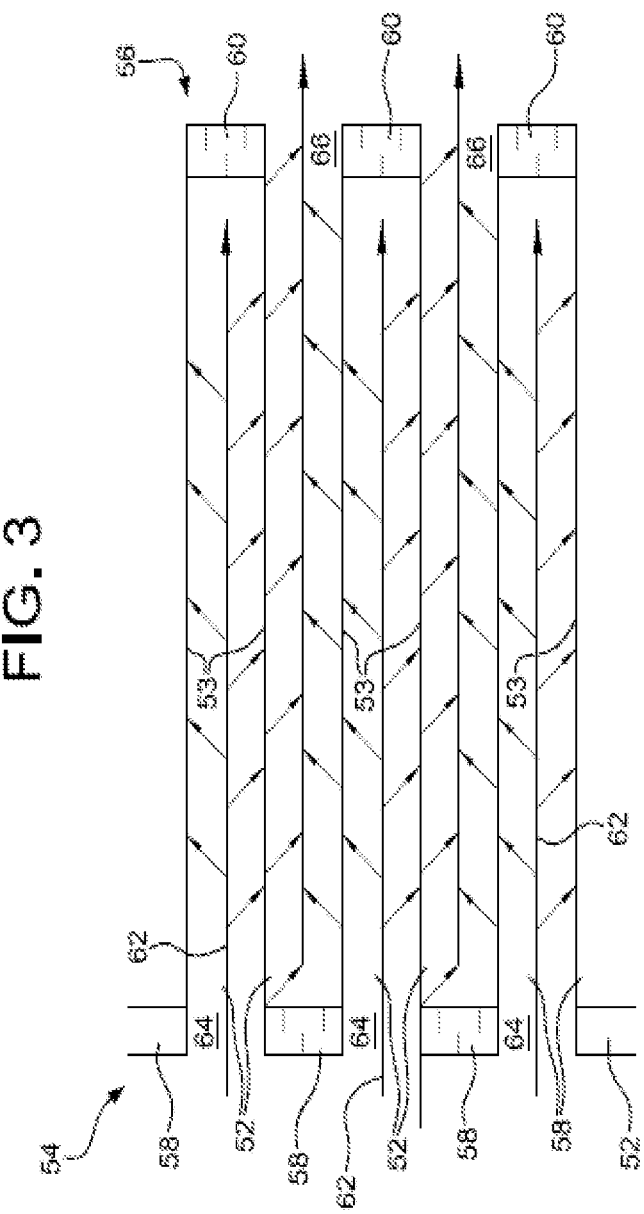
FIG. 4 is a cut-away view of a section of a wall flow filter substrate.

FIGS. 3 and 4 illustrate a wall flow filter substrate 50 which has a plurality of passages 52. The passages are tubularly enclosed by the internal walls 53 of the filter substrate. The substrate has an inlet or upstream end 54 and an outlet or downstream end 56. Alternate passages are plugged at the inlet end with inlet plugs 58 and at the outlet end with outlet plugs 60 to form opposing checkerboard patterns at the inlet 54 and outlet 56. A gas stream 62 enters at upstream end 54 through the unplugged channel inlet 64, is stopped by outlet plug 60 and diffuses through channel walls 53 (which are porous) to the outlet side 66. A coating on the inlet side of the filter means that the coating resides on or within the walls 53 such that the gas stream 62 contacts the inlet coating first. A coating on the outlet side of the filter means that the coating resides on or within the walls 53 such that the gas stream 62 contacts the outlet coating after the inlet coating. The gas cannot pass back to the inlet side of walls because of inlet plugs 58.

Wall flow filter substrates can be composed of ceramic-like materials such as cordierite, alumina, silicon carbide, aluminum titanate, mullite, or of refractory metal. Wall flow substrates may also be formed of ceramic fiber composite materials. Specific wall flow substrates are formed from cordierite, silicon carbide, and aluminum titanate. Such materials are able to withstand the environment, particularly high temperatures, encountered in treating the exhaust streams.

Wall flow substrates for use in the inventive system can include thin porous walled honeycombs (monoliths) through which the fluid stream passes without causing too great an increase in back pressure or pressure across the article. Ceramic wall flow substrates used in the system can be formed of a material having a porosity of at least 40% (e.g., from 40 to 70%). Useful wall flow substrates can have an overall mean pore size of 10 or more microns. Certain wall flow substrates have an asymmetric pore size distribution having a first mean pore size of no more than 30 μm and a second mean pore size of no less than 30 μm. In a specific embodiment, the substrates can have a porosity of at least 55% and a first mean pore size in the range of 10 to 30 microns and a second mean pore size in the range of 31 to 100 microns. When substrates with these porosities and these mean pore sizes are coated with the techniques described below, adequate levels of TWC compositions can be loaded onto the substrates to achieve excellent hydrocarbon, CO, and/or NOx conversion efficiency. These substrates are still able retain adequate exhaust flow characteristics, i.e., acceptable back pressures, despite the catalyst loading.

The porous wall flow filter used in this invention is catalyzed in that the wall of the element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more washcoats of catalytic materials and combinations of one or more washcoats of catalytic materials on the inlet and/or outlet walls of the element.

To coat the wall flow filters with the TWC or oxidation catalyst composition, the substrates are immersed vertically in a portion of the catalyst slurry such that the top of the substrate is located just above the surface of the slurry. In this manner slurry contacts the inlet face of each honeycomb wall, but is prevented from contacting the outlet face of each wall. The sample is left in the slurry for about 30-60 seconds. The filter is removed from the slurry, and excess slurry is removed from the wall flow filter first by allowing it to drain from the channels, then by blowing with compressed air (against the direction of slurry penetration), and then by pulling a vacuum from the direction of slurry penetration. By using this technique, the catalyst slurry permeates the walls of the filter, yet the pores are not occluded to the extent that undue back pressure will build up in the finished filter. As used herein, the term "permeate" when used to describe the dispersion of the catalyst slurry on the filter, means that the catalyst composition is dispersed throughout the wall of the filter.

The coated filters are dried typically at about 100° C. and calcined at a higher temperature (e.g., 300 to 450° C. and up to 590° C.). After calcining, the catalyst loading can be determined through calculation of the coated and uncoated weights of the filter. As will be apparent to those of skill in the art, the catalyst, loading can be modified by altering the solids content of the coating slurry. Alternatively, repeated immersions of the filter in the coating slurry can be conducted, followed by removal of the excess slurry as described above.

With reference to a metallic substrate, a useful substrate may be composed of one or more metals or metal alloys. The metallic carriers may be employed in various shapes such as corrugated sheet or monolithic form. Specific metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface of the metal carriers may be oxidized at high temperatures, e.g., 1000° C. and higher, to improve the resistance to corrosion of the alloys by forming an oxide layer on the surfaces of the carriers. Such high temperature-induced oxidation may enhance adherence of a catalytic material to the carrier.

Preparation of Catalyst Composite Washcoats

The catalyst composites may be formed in a single layer or multiple layers. In some instances, it may be suitable to prepare one slurry of catalytic material and use this slurry to form multiple layers on the carrier. The composites can readily prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member, which is sufficiently porous to permit the passage there through of the gas stream being treated. A "washcoat layer," therefore, is defined as a coating that is comprised of support particles. A "catalyzed washcoat layer" is a coating comprised of support particles impregnated with catalytic components.

The catalyst composite can be readily prepared in layers on a carrier. For a first layer of a specific washcoat, finely divided particles of a high surface area refractory metal oxide such as gamma alumina are slurried in an appropriate vehicle, e.g., water. To incorporate components such as precious metals (e.g., palladium, rhodium, platinum, and/or combinations of the same), stabilizers and/or promoters, such components may be incorporated in the slurry as a mixture of water soluble or water-dispersible compounds or complexes. Typically, when palladium is desired, the palladium component is utilized in the form of a compound or complex to achieve dispersion of the component on the refractory metal oxide support, e.g., activated alumina. The term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or rhodium nitrate.

A suitable method of preparing any layer of the layered catalyst composite of the invention is to prepare a mixture of a solution of a desired precious metal compound (e.g., palladium compound) and at least one support, such as a finely divided, high surface area, refractory metal oxide support, e.g., gamma alumina, which is sufficiently dry to absorb substantially all of the solution to form a wet solid which later combined with water to form a coatable slurry. In one or more embodiments, the slurry is acidic, having, for example, a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry.

In one embodiment, the slurry is thereafter comminuted to result in substantially all of the solids having particle sizes of less than about 30 microns, i.e., between about 0.1-15 microns, in an average diameter. The comminution may be accomplished in a ball mill, circular mill, or other similar equipment, and the solids content of the slurry may be, e.g., about 20-60 wt. %, more particularly about 30-40 wt. %.

Additional layers, i.e., the second and third layers may be prepared and deposited upon the first layer in the same manner as described above for deposition of the first layer upon the carrier.

EXAMPLES

The following non-limiting examples shall serve to illustrate the various embodiments of the present invention. In each of the examples, the carrier is cordierite.

Example 1

Comparative

A three-way conversion (TWC) catalyst on a honeycomb flow through substrate with a washcoat loading of 1 g/in$^3$ (61 g/L) was prepared. The flow through substrate had a size of 4.66*5", 300/12 cpsi, 1.4 L volume, 30 g/ft$^3$ platinum group metals (PGM), and a PGM ratio of Pt/Pd/Rh of 0/27/3.

Example 2

A particle filter of low porosity having a three-way conversion (TWC) catalyst within the substrate wall was prepared at washcoat loadings of 1 g/in$^3$ (61 g/L), 2 g/in$^3$ (122 g/L (2 g/in$^3$), and 3 g/in$^3$ (183 g/L). The filter substrate had a size of 4.66*5", 300/12 cpsi, 1.4 L volume, 30 g/ft$^3$ platinum group metals (PGM), and a PGM ratio of Pt/Pd/Rh of 0/27/3. The filter substrate had a 45% porosity and a mean pore size of 13 μm.

Example 3

A particle filter of high porosity having a three-way conversion (TWC) catalyst within the substrate wall was prepared at washcoat loadings of 1 g/in$^3$ (61 g/L), 2 g/in$^3$ (122 g/L), and 3 g/in$^3$ (183 g/L). The filter substrate had a size of 4.66*5", 300/12 cpsi, 1.4 L volume, 30 g/ft$^3$ platinum group metals (PGM), and a PGM ratio of Pt/Pd/Rh of 0/27/3. The filter substrate had a 65% porosity and a mean pore size of 20 µm.

Example 4

The composites of Examples 1, 2, and 3 each having 1 g/in$^3$ (61 g/L) were aged for 4 hours under hydrothermal oven aging at 900° C. in 2% $O_2$, 10% $H_2O$, and balance $N_2$. Under New European Drive Cycle (NEDC) conditions and a 1.6 L engine with composite located downstream of the gasoline direct injection engine in a close-coupled position, particulate number was measured using PMP protocol (Table 1). Emissions of non-methane hydrocarbons (NMHC), total hydrocarbons (HC), carbon monoxide (CO), and NOx were also measured (Table 1).

TABLE 1

|  | Example 1 Comparative | Example 2 (low porosity) | Example 3 (high porosity) | Euro 6 Std |
|---|---|---|---|---|
| Particulate Number (#/km) | 1.61E+12 | 1.91E+11 | 7.08E+11 | 6.00E+11* |
| NMHC (g/km) | 0.06 | 0.155 | 0.134 | 0.068 |
| THC (g/km) | 0.069 | 0.169 | 0.146 | 0.1 |
| CO/10 (g/km) | 0.0313 | 0.07 | 0.0585 | 0.1 |
| NOx (g/km) | 0.124 | 0.244 | 0.228 | 0.060 |

*As proposed by the European Commission.

There is significantly lower TWC catalytic efficiency for the coated filters of Examples 2 and 3 as compared to comparative Example 1. The comparative flow through substrate of Example 1, however, shows no filtration efficiency. The low porosity filter of Example 2 at a washcoat loading of 1 g/in$^3$ (61 g/L) met the Euro 6 standard. Backpressure of Examples 2 and 3 were evaluated during the EUDC segment of the NEDC. There was significantly higher backpressure for Example 2 as compared to Example 3.

Example 5

The composites of Example 3 at varying washcoat loadings were aged for 80 hours under 1000° C. exothermic aging. Under New European Drive Cycle (NEDC) conditions and a 1.6 L engine with composite located downstream of the gasoline direct injection engine in a close-coupled position, particulate number was measured using PMP protocol (Table 2a). Emissions of particulate mass, total hydrocarbons (HC), carbon monoxide (CO), and NOx were also measured (Table 2a).

TABLE 2a

|  | Example 3 1 g/in$^3$ (61 g/L) | Example 3 2 g/in$^3$ (122 g/L) | Example 3 3 g/in$^3$ (183 g/L) | Euro 6 Std |
|---|---|---|---|---|
| Particulate Number (#/km) | 4.09E+12 | 1.30E+11 | 8.3E+10 | 6.00E+11* |
| Particulate Mass (g/km) | 0.0005 | 0.0006 | 0.0007 | 0.0045 |
| HC (g/km) | 0.335 | 0.294 | 0.269 | 0.1 |
| CO/10 (g/km) | 0.1744 | 0.1585 | 0.1366 | 0.1 |
| NOx (g/km) | 0.425 | 0.385 | 0.289 | 0.060 |

*As proposed by the European Commission.

Increasing the washcoat loading moved the high porosity filter well under the Euro 6 particulate number regulation. The particulate emissions of all of the filters easily met the Euro 6 standard. Higher washcoat loading reduced emissions, especially NOx. Backpressure for Example 3, high porosity filter, at 2 g/in$^3$ loading was similar to an uncoated filter of low porosity as provided in Example 2.

Filter substrates of 4.66×4.5" of the porosity of the loadings of Example 3 high porosity filters were also aged for 80 hours under 1000° C. exothermic aging and their oxygen storage capacities were tested. Table 2b provides a summary of the data, which were calculated based in front/rear sensor delay time rich/lean at 501° C./26.1 kg/h.

TABLE 2b

|  | Example 3 1 g/in$^3$ (61 g/L) | Example 3 2 g/in$^3$ (122 g/L) | Example 3 3 g/in$^3$ (183 g/L) |
|---|---|---|---|
| Oxygen Storage (mg) | 12.0 | 20.9 | 28.9 |

Increasing the washcoat loading also increases the oxygen storage capability.

Example 6

The coated filters having 1 g/in$^3$ (122 g/L) and 3 g/in$^3$ (183 g/L) were combined with close coupled TWC catalyst on a flow through substrate having 60 g/ft$^3$ precious group metals. These were tested for $CO_2$ emissions along with comparative systems having either only the close coupled TWC catalyst on a flow through substrate (CC) or the close coupled TWC catalyst on a flow through substrate in combination with an under floor (UF) TWC. The results for individual NEDC evaluations on a 2.0 L engine with composite located downstream of the gasoline direct injection engine in under floor position, are provided in Table 3.

TABLE 3

| $CO_2$ emissions (g/km) | CC + Example 3 1 g/in$^3$ (61 g/L) | CC + Example 3 3 g/in$^3$ (183 g/L) | CC only | CC + UF TWCs |
|---|---|---|---|---|
| Test # 1 | 186.89 | 183.04 | 186.5 | 183.16 |
| Test # 2 | 184.03 | 182.9 | 185.97 | 184.3 |
| Test # 3 | 182.39 | 184.4 | 185.04 | 182.23 |
| Test # 4 | 180.82 | 182.7 | — | — |
| Test # 5 | 181.6 | — | — | — |

Similar levels of $CO_2$ emissions for close coupled TWC catalyst in combination with coated particulate filters as compared to TWC catalyst-only systems indicated no fuel penalty under NEDC test conditions.

Example 7

The systems of Example 6, with the addition of the 2 g/in³ (122 g/L) loading of Example 3, were then aged for 80 hours under 1000° C. exothermic aging. Under New European Drive Cycle (NEDC) conditions and a 2.0 L engine with composite located downstream of the gasoline direct injection engine in under floor position, total hydrocarbons (HC), carbon monoxide (CO), and NOx were measured (Table 4).

TABLE 4

|  | CC + Example 3 1 g/in³ (61 g/L) | CC + Example 3 2 g/in³ (122 g/L) | CC + Example 3 3 g/in³ (183 g/L) | CC only | CC + UF |
|---|---|---|---|---|---|
| HC (g/km) | 0.0428 | 0.0411 | 0.0370 | 0.0472 | 0.0283 |
| CO/10 (g/km) | 0.0579 | 0.0601 | 0.0592 | 0.0640 | 0.0444 |
| NOx (g/km) | 0.0498 | 0.0459 | 0.0449 | 0.0615 | 0.0343 |

Addition of underfloor (UF) TWC or coated particulate filter allowed the system to meet Euro 6 emission standards.

Example 8

A system of a 60 g/ft³ platinum group metal TWC catalyst in a close-coupled position and a 3 g/in³ coated particulate filter was aged for 80 hours under 1000° C. exothermic aging and was tested under repeated NEDC tests using a 2.0 L engine. Table 5 shows particulate numbers for the coated filter after 3 tests. This coated filter was then subjected to a regeneration activity of 15 minutes simulated highway driving, multiple accelerations and fuel cuts having a maximum velocity of ~130 km/h and reaching 700° C. NEDC tests were then repeated 4 more times.

TABLE 5

| Particulate Number (#/km) | Example 3 g/in³ (g/L) |
|---|---|
| Test # 1 | 2.53E+11 |
| Test # 2 | 4.96E+10 |
| Test # 3 | 2.00E+10 |
| Regeneration event. | |
| Test # 1b | 2.35E+11 |
| Test # 2b | 4.89E+10 |
| Test # 3b | 2.68E+10 |
| Test # 4b | 1.68E+10 |

Table 5 indicates that the filtration efficiency of the particulate filter improved over time. In addition, it is shown that the coated filter can be regenerated under expected highway driving conditions. Emissions data was also obtained that showed no effect on HC, CO, or NOx conversion after the regeneration event.

Example 9

Coated particulate filters of varying loadings of Example 3 were tested under repeated NEDC tests using a 2.0 L engine with composite located downstream of the gasoline direct injection engine in an under floor position. Table 6 shows particulate numbers for the coated filters.

TABLE 6

|  | CC + Example 3 1 g/in³ (61 g/L) | CC + Example 3 2 g/in³ (122 g/L) | CC + Example 3 3 g/in³ (183 g/L) |
|---|---|---|---|
| Test # 1 | 6.74E+11 | 3.33E+11 | 2.35E+11 |
| Test # 2 | 5.26E+11 | 7.08E+10 | 4.89E+10 |
| Test # 3 | 5.76E+11 | — | 2.68E+10 |
| Test # 4 | 5.52E+11 | — | 1.68E+10 |

Filtration efficiency of high porosity filter in underfloor position improved as washcoat loading increased.

Example 10

A catalyzed particle filter having a three-way conversion (TWC) catalyst on or within the substrate wall was prepared at a washcoat loadings of 2 g/in³ (122 g/L) with varying zoning configurations. The uncoated filter substrate had a mean pore size of 20 µm and had size of 4.66*5", 300/12 cpsi, 1.4 L volume. The washcoat contained 60 g/ft³ platinum group metals (PGM), and a PGM ratio of Pt/Pd/Rh of 0/57/3. Table 7 provides a summary of the washcoat of Examples 10A, 10B, and 10C and resulting filter in comparison to an uncoated filter. With respect to porosity, sections of the filter were tested, including front, middle, and rear portions. The middle portion was a small fraction of the overall substrate. Porosity of the filter is usually obtained from an average of the porosity measurements of the front and rear portions. With respect to the d50 and d90 particle sizes recited for Example 10C, which had an asymmetric particle size distribution, they correspond to the sum of two monomodal distributions.

TABLE 7

|  | Example 10A | Example 10B | Example 10C | Uncoated Filter |
|---|---|---|---|---|
| Washcoat Loading g/in³ (g/L) | 2 (122) | 2 (122) | 2 (122) | — |
| Particles Character | single average size Substantially symmetric distribution | single average size Substantially symmetric distribution | two average sizes asymmetric distribution | — |
| Washcoat Particles | | | | |
| d50 (µm) | 2.04 | 2.04 | 3.19 | — |
| frequency | 94 | 94 | 95 | |
|  | Max = 94 | Max = 94 | Max = 99 | |
| Washcoat Particles | | | | |
| d90 (µm) | 5.48 | 5.48 | 16.37 | — |
| frequency | 45 | 45 | 48 | |
| Zoning | 100% inlet 100% outlet | 50% inlet 50% outlet | 100% inlet 100% outlet | — |
| Porosity | | | | |
| Full porosity front (porosity contribution of pores larger than 30 µm) | 57.0% (5.7%) | 58.8% (7.4%) | 59.5% (4%) | 62.5% (9.7%) |
| Full porosity middle (porosity contribution of pores larger than 30 µm) | 56.5% (5.1%) | 54.4% (5.0%) | 61.2% (4.1%) | 63.5% (10.1%) |
| Full porosity rear (porosity contribution of | 57.5% (5.8%) | 58.1% (7.2%) | 60.9% (3.7%) | 63.0% (10.6%) |

TABLE 7-continued

|  | Example 10A | Example 10B | Example 10C | Uncoated Filter |
|---|---|---|---|---|
| pores larger than 30 μm) |  |  |  |  |

Example 11

Figure 5:
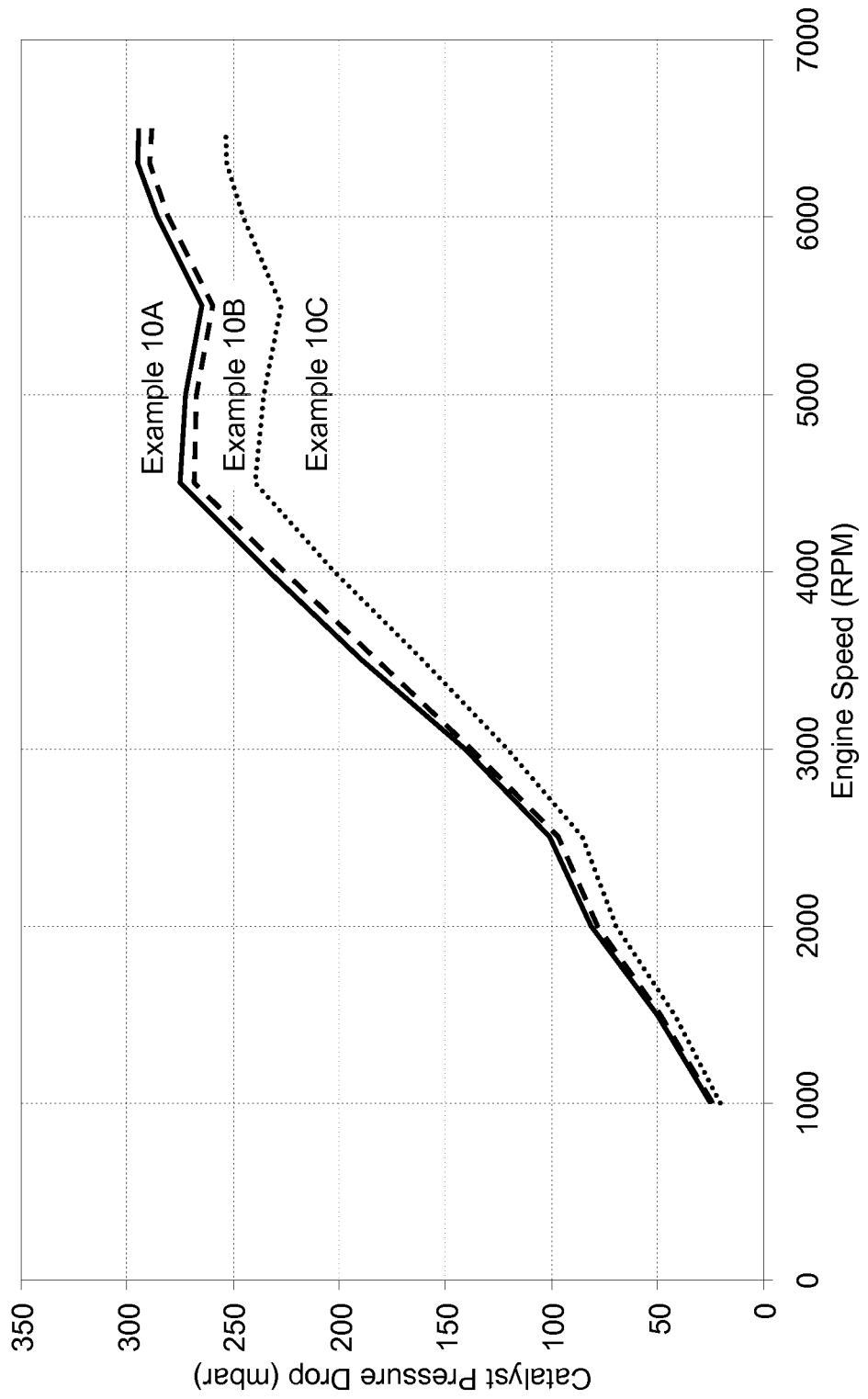
FIG. 5 is a graph of catalyst pressure drop as a function of engine speed for embodiments of various porosities.

The catalyzed filters of Example 10 were aged for 80 hours under 1000° C. exothermic aging. Under New European Drive Cycle (NEDC) conditions and a 1.6 L engine with composite located downstream of the gasoline direct injection engine in close-coupled position, particulate number was measured using PMP protocol (Table 8). Emissions of particulate mass, total hydrocarbons (HC), carbon monoxide (CO), and NOx were also measured (Table 8). Impact of porosity on backpressure is provided in FIG. 5.

TABLE 8

|  | Example 10A | Example 10B | Example 10C | Euro 6 Std |
|---|---|---|---|---|
| Particulate Number (#/km) | 3.97E+11 | 1.81E+11 | 1.73E+11 | 6.00E+11* |
| NMHC (g/km) | 0.098 | 0.095 | 0.092 | 0.068 |
| THC (g/km) | 0.109 | 0.106 | 0.103 | 0.1 |
| CO/10 (g/km) | 0.0982 | 0.0955 | 0.0903 | 0.1 |
| NOx (g/km) | 0.106 | 0.102 | 0.093 | 0.060 |

*As proposed by the European Commission.

The data of Table 8 indicate that the higher porosity catalyzed filter of Example 10C having a washcoat that is coated 100% on the inlet and 100% on the outlet having two average particles sizes provides lower NOx, CO, and HC conversion at a constant overall loading as compared to Example 10A. Filtration efficiency is also improved with the washcoat of Example 10C.

Example 12

A catalyzed particle filter having a three-way conversion (TWC) catalyst on or within the substrate wall was prepared at a washcoat loadings of 2 g/in$^3$ (122 g/L) with varying zoning configurations. The uncoated filter substrate had a mean pore size of 20 μm and had size of 4.66*5", 300/12 cpsi, 1.4 L volume. The washcoat contained 60 g/ft$^3$ platinum group metals (PGM), and a PGM ratio of Pt/Pd/Rh of 0/57/3. Table 9 provides a summary of the washcoat of Examples 12A, 12B, 12C, and 12D and resulting filter. The uncoated filter is that shown in Table 7. With respect to porosity, sections of the filter were tested, including front, middle, and rear portions. The middle portion was a small fraction of the overall substrate. Porosity of the filter is usually obtained from an average of the porosity measurements of the front and rear portions. With respect to the d50 and d90 particle sizes recited for Examples 12A, 12B, 12C, and 12D, which had an asymmetric particle size distributions, they correspond to the sum of two monomodal distributions.

TABLE 9

|  | Example 12A | Example 12B | Example 12C | Example 12D |
|---|---|---|---|---|
| Washcoat Loading g/in$^3$ (g/L) | 2 (122) | 2.5 (152.5) | 2 (122) | 2.5 (152.5) |
| Particles Character | two average sizes asymmetric distribution | two average sizes asymmetric distribution | two average sizes asymmetric distribution | two average sizes asymmetric distribution |
| Washcoat Particles d50 (μm) frequency | 2.23 | 2.23 | 2.23 | 2.23 |
| Washcoat Particles d90 (μm) frequency | 6.6 | 6. | 6.6 | 6.6 |
| Zoning | 50% inlet 50% outlet | 50% inlet 50% outlet | 100% inlet 100% outlet | 100% inlet 100% outlet |
| Porosity |  |  |  |  |
| Full porosity front (porosity contribution of pores larger than 30 μm) | 61.2% (5.3%) | 62.4% (4.8%) | 60.4% (5.5%) | 60.0% (3.7%) |
| Full porosity middle (porosity contribution of pores larger than 30 μm) | 56.4% (2.7%) | 61.9% (3.1%) | 60.1% (5.4%) | 60.1% (3.2%) |
| Full porosity rear (porosity contribution of pores larger than 30 μm) | 61.7% (6.0%) | 62.4% (4.8%) | 61.7% (5.9%) | 59.9% (4.0%) |

Example 13

The catalyzed filters of Example 12 are aged for 80 hours under 1000° C. exothermic aging. Under New European Drive Cycle (NEDC) conditions and a 1.6 L engine with composite located downstream of the gasoline direct injection engine in close-coupled position, particulate number is measured using PMP protocol. Emissions of particulate mass, total hydrocarbons (HC), carbon monoxide (CO), and NOx are also measured.

Example 14

A particle filter having a catalytic material is prepared using two coats: a first inlet coat and a second inlet coat. The three-way conversion (TWC) catalyst composite contains palladium such that an upstream zone has more palladium than a downstream zone. The coats are prepared as follows:

First Inlet Coat

The components present in the first inlet coat are a ceria-zirconia composite with 45% ceria by weight and palladium. The first inlet coat is provided along the entire length of the filter. After coating, the filter plus the first inlet coat are dried and then calcined at a temperature of 550° C. for about 1 hour.

Second Inlet Coat

The second inlet coat comprises palladium, which is applied as a dip or as a washcoat slurry along a length of the filter starting from the upstream end to form an upstream zone. After application, the filter plus the first inlet coat and second inlet coat are dried and then calcined at a temperature of 550° C. for about 1 hour.

Example 15

A particle filter having a catalytic material is prepared using two coats: an inlet coat and an outlet coat. The three-way conversion (TWC) catalyst composite contains palladium and rhodium. The coats are prepared as follows:
Inlet Coat
The component present in the first inlet coat is palladium, and this coat is free of ceria. After coating, the filter plus the inlet coat are dried and then calcined at a temperature of 550° C. for about 1 hour.
Outlet Coat
The outlet coat comprises rhodium and a ceria-zirconia composite with 45% ceria by weight. After application, the filter plus the inlet coat and the outlet coat are dried and then calcined at a temperature of 550° C. for about 1 hour.

Example 16

A particle filter having a catalytic material is prepared using two coats: an inlet coat and an outlet coat. The three-way conversion (TWC) catalyst composite contains platinum and rhodium. The coats are prepared as follows:
Inlet Coat
The components present in the first inlet coat are platinum and barium as a NOx trapping material. After coating, the filter plus the inlet coat are dried and then calcined at a temperature of 550° C. for about 1 hour.
Outlet Coat
The outlet coat comprises rhodium and a ceria-zirconia composite with 45% ceria by weight. After application, the filter plus the inlet coat and the outlet coat are dried and then calcined at a temperature of 550° C. for about 1 hour.

Example 17

A particle filter having a catalytic material is prepared using two coats: an inlet coat and an outlet coat. The three-way conversion (TWC) catalyst composite contains platinum and palladium. The coats are prepared as follows:
Inlet Coat
The component present in the first inlet coat is palladium, and this coat is ceria-free. After coating, the filter plus the inlet coat are dried and then calcined at a temperature of 550° C. for about 1 hour.
Outlet Coat
The outlet coat comprises platinum, a ceria-zirconia composite with 45% ceria by weight, and a zeolite that is a hydrocarbon trapping material. After application, the filter plus the inlet coat and the outlet coat are dried and then calcined at a temperature of 550° C. for about 1 hour.

Example 18

A particle filter having a catalytic material is prepared using one inlet coat. The inlet coat has a bimodal particle size distribution, such that a first mean particle size is 30 μm or less and a second particle size is more than 30 μm. The particle filter has a bimodal pore size distribution, such that a first mean pore size is 30 μm or less and a second pore size is more than 30 μm.

Example 19

A particle filter having a catalytic material is prepared using two inlet coats. The first inlet coat has a first mono-modal particle size distribution, with a mean particle size is 30 μm or less, which is coated along 50% of the inlet from the upstream end. The second inlet coat has a second monomodal particle size distribution, with a mean particle size is more than 30 μm, which is coated the entire length of the filter. The particle filter has a bimodal pore size distribution, such that a first mean pore size is 30 μm or less and a second pore size is more than 30 μm or more.

Example 20

A particle filter of EXAMPLE 19 was further prepared with a second inlet coat has a third monomodal particle size distribution, with a mean particle size of about 15 μm, which is coated along 50% of the inlet from the upstream end.

Example 21

Comparative

A particle filter having a catalytic material is prepared using two coats: an inlet coat and an outlet coat. A three-way conversion (TWC) catalytic material is formed from a washcoat of palladium, rhodium, alumina, and ceria-zirconia having a monomodal particle size distribution with a mean particle size of 3.5 μm. The coats are prepared as follows:
Inlet Coat
The inlet side of the filter is coated with the TWC catalytic material washcoat at a loading of 0.5 g/in$^3$. After coating, the filter plus the inlet coat are dried and then calcined at a temperature of 550° C. for about 1 hour.
Outlet Coat
The outlet side of the filter is coated with the same washcoat and loading as the inlet side. After application, the filter plus the inlet coat and outlet coat are dried and then calcined at a temperature of 550° C. for about 1 hour.

Example 22

Comparative

A particle filter having a catalytic material is prepared using one inlet coat. The three-way conversion (TWC) catalyst composite is formed from a washcoat of palladium, rhodium, alumina, and ceria-zirconia having a monomodal particle size distribution with a mean particle size of 3.5 μm. The inlet coat is prepared as follows:
Inlet Coat
The inlet side of the filter is coated with the TWC washcoat at a loading of 1.0 g/in$^3$. After coating, the filter plus the inlet coat are dried and then calcined at a temperature of 550° C. for about 1 hour.

Example 23

A particle filter having a three-way conversion (TWC) catalytic material is prepared using one inlet coat. The inlet coat is formed from a washcoat in an amount in the range of 0.5 to 4.0 g/in$^3$, where the washcoat comprises palladium, rhodium, and ceria-zirconia. This washcoat is substantially free of alumina, such that there is up to only 5% alumina by weight of the total catalytic material loading.

Example 24

A particle filter having a three-way conversion (TWC) catalytic material is prepared using two inlet coats. The first inlet coat is formed from a washcoat in an amount in the range of 0.25 to 2.0 g/in$^3$, where the washcoat comprises palladium and a ceria-zirconia. The second inlet coat is formed from a washcoat in an amount in the range of 0.25 to 2.0 g/in$^3$, where the washcoat comprises rhodium and a ceria-zirconia that is either the same or different from the ceria-zirconia of the first inlet coat. Both washcoats are substantially free of alumina, such that there is up to only 5% alumina by weight of the total catalytic material loading.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed is:

1. An emission treatment system downstream of a gasoline direct injection engine for treatment of an exhaust stream comprising hydrocarbons, carbon monoxide, nitrogen oxides, and particulates, the emission treatment system comprising a catalyzed particulate filter comprising:
    a three-way conversion (TWC) catalytic material that is coated onto or within a particulate filter having an uncoated porosity;
    wherein the catalyzed particulate filter has a coated porosity that is substantially the same as the uncoated porosity of the particulate filter.

2. The emission treatment system of claim 1, wherein the TWC catalytic material stores at least 100 mg/L of oxygen after a full useful life aging.

3. The emission treatment system of claim 1, wherein the uncoated porosity and the coated porosity are within 7% of each other.

4. The emission treatment system of claim 1, wherein the uncoated porosity and the coated porosity are in the range of 55 to 70%.

5. The emission treatment system of claim 1 comprising the TWC catalytic material in an amount in the range of 1.0 to 4.0 g/in$^3$ (61 to 244 g/L).

6. The emission treatment system of claim 1, wherein the particulate filter comprises a pore size distribution such that a first set of pores has a first mean pore size of 30 µm or less and second set of pores has a second mean pore size of more than 30 µm.

7. The emission treatment system of claim 6, wherein the first mean pore size is in the range of 5-30 µm and the second mean pore size is in the range of 30-300 µm.

8. The emission treatment system of claim 1, wherein the TWC catalytic material comprises a particle size distribution such that a first set of particles has a first $d_{90}$ particle size of 7.5 µm or less and a second set of particles has a second $d_{90}$ particle size of more than 7.5 µm.

9. The emission treatment system of claim 8, wherein the first $d_{90}$ particle size is 6.0 µm or less and the second $d_{90}$ particle size is 10.0 µm or more.

10. The emission treatment system of claim 8, wherein the first $d_{90}$ particle size is in the range of 1-7.5 µm and the second $d_{90}$ particle size is in the range of 7.6-100 µm.

11. The emission treatment system of claim 8, wherein the TWC catalytic material comprises the second set of particles in an amount in the range of 10-50% by weight.

12. The emission treatment system of claim 1, wherein the TWC catalytic material is formed from a single washcoat composition that is coated onto or within an inlet side, an outlet side, or both of the particulate filter.

13. The emission treatment system of claim 1, wherein the TWC catalytic material comprises rhodium, palladium, ceria or a ceria composite, and alumina.

14. The emissions treatment system of claim 12, wherein a first single washcoat layer is present on the inlet side along 100% of the axial length of the particulate filter and a second single washcoat layer is present on the outlet side along 100% of the axial length of the particulate filter.

15. The emissions treatment system of claim 12, wherein a first single washcoat layer is present on the inlet side along 50 to 75% of the axial length of the particulate filter from the upstream end and a second single washcoat layer is present on the outlet side along 50 to 75% of the axial length of the particulate filter from the downstream end.

16. The emissions treatment system of claim 12, wherein a first single washcoat layer is present on the inlet side along up to 50% of the axial length of the particulate filter from the upstream end and a second single washcoat layer is present on the outlet side along up to 50% of the axial length of the particulate filter from the downstream end.

17. The emission treatment system of claim 1, wherein the particulate filter comprises cordierite, alumina, silicon carbide, aluminum titanate, or mullite.

18. A catalyzed particulate filter located in an emission treatment system downstream of a gasoline direct injection engine for treatment of an exhaust stream comprising hydrocarbons, carbon monoxide, nitrogen oxides, and particulates, the catalyzed particulate filter comprising:
    a three-way conversion (TWC) catalytic material that is coated onto or within a particulate filter in an amount in the range of 1.0 to 4 g/in$^3$ (122 to 244 g/L);
    wherein the TWC catalytic material stores at least 100 mg/L of oxygen after a full useful life aging and comprises an oxygen storage component in an amount in the range of 1.0 to 4.0 g/in$^3$ (122 g/L to 244 g/L);
    wherein the particulate filter comprises a pore size distribution such that a first set of pores has a first mean pore size of 30 µm or less and second set of pores has a second mean pore size of more than 30 µm; and
    wherein the TWC catalytic material comprises a particle size distribution such that a first set of particles has a first $d_{90}$ particle size of 7.5 µm or less and a second set of particles has a second $d_{90}$ particle size of more than 7.5 µm.

19. The emissions treatment system of claim 18, wherein an upstream zone and a downstream zone both comprise a palladium component, wherein the upstream zone comprises the palladium component in an amount that is greater than the amount of the palladium component in the downstream zone.

20. The emissions treatment system of claim 18, wherein a first single washcoat layer is present on the inlet side along 50 to 75% of the axial length of the particulate filter from the upstream end and a second single washcoat layer is present on the outlet side along 50 to 75% of the axial length of the particulate filter from the downstream end.

21. A method of treating an exhaust gas comprising hydrocarbons, carbon monoxide, nitrogen oxides, and particulates, the method comprising:
providing a catalyzed particulate filter comprising a three-way conversion (TWC) catalytic material coated onto or within a particulate filter in an amount of effective to provide a particulate emissions number of no more than $6 \times 10^{11}$ per kilometer;
locating the catalyzed particulate filter downstream of a gasoline direct injection engine; and
contacting exhaust gas from the gasoline direct injection engine with the catalyzed particulate filter.

22. The method of claim 21 further comprising providing full TWC functionality by the catalyzed particulate filter, a TWC catalyst on a flow through substrate, or combinations thereof.

23. The method of claim 21, comprising providing the catalyzed particulate filter of claim 18.

24. The method of claim 21 further comprising providing the TWC catalytic material in an amount in the range of 1.0-4.0 g/in$^3$ (61-244 g/L).

25. The method of claim 21 further comprising storing at least 100 mg/L of oxygen by the TWC catalytic material after a full useful life aging.

26. A method of making a catalyzed particulate filter, the method comprising:
providing a particulate filter;
providing a three-way conversion (TWC) catalytic material; and
coating the TWC catalytic material onto or into the particulate filter in an amount of at least 1.0 g/in$^3$ (61 g/L) to form the catalyzed particulate filter such that the catalyzed particulate filter has a coated porosity that is substantially the same as an uncoated porosity of the particulate filter.

* * * * *